United States Patent
Weiss

[15] 3,690,385
[45] Sept. 12, 1972

[54] CULTIVATING IMPLEMENTS

[72] Inventor: Stanley Marian Weiss, 9 Savage St., Geelong, Victoria, Australia

[22] Filed: Sept. 8, 1970

[21] Appl. No.: 70,459

[30] Foreign Application Priority Data
Sept. 9, 1969 Australia..............60648/69

[52] U.S. Cl..................................172/604, 172/705
[51] Int. Cl. ........................A01b 15/16, A01b 23/06
[58] Field of Search...........172/604, 543, 548, 540, 554–556, 172/574, 705, 524, 640, 54; 175/373; 308/19, 181

[56] References Cited

UNITED STATES PATENTS

| | | |
|---|---|---|
| 358,246 | 2/1887 | Arnett........................172/604 |
| 1,663,239 | 3/1928 | Bucknam....................172/604 |
| 3,397,933 | 8/1968 | Hatcher......................172/604 |
| 3,576,216 | 4/1971 | Tanke.........................172/604 |

*Primary Examiner*—Robert E. Pulfrey
*Assistant Examiner*—C. W. Hanor
*Attorney*—Woodhams, Blanchard and Flynn

[57] ABSTRACT

A cultivating disc having a central aperture and connected at a plurality of locations disposed around the central aperture to a mount member in such manner that at said locations localized radial movements of the disc are permitted. The aperture reduces stiffness of the central part of the disc and the permitted localized radial movements enable this central part to behave elastically whereby fractures are minimized.

8 Claims, 3 Drawing Figures

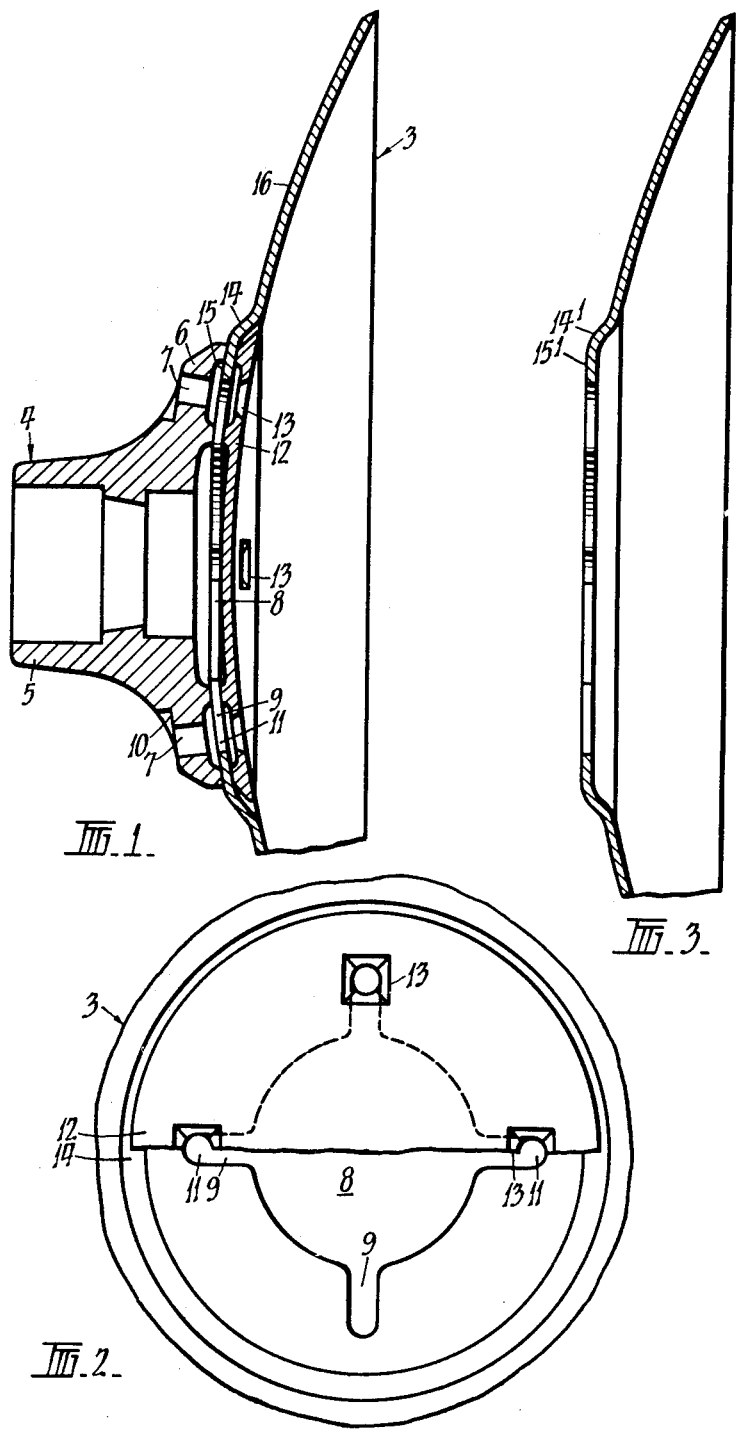

CULTIVATING IMPLEMENTS

BACKGROUND OF THE INVENTION

1. Field of Invention

This invention relates to soil cultivating implements. More particularly, it is concerned with implements of the type fitted with soil cultivating discs, disc ploughs being the most common implements of this type.

2 Description of Prior Art

The cultivating discs of disc ploughs cut and turn the soil through angles of about 10° to 25° relative to the line of the travel of the plough. In working, these discs become highly stressed, the actual working stresses being dependent upon a number of factors of which the most significant are: the texture of the soil; obstacles encountered in the soil (such as stumps or rocks); the power, speed and acceleration of the towing tractor; the number of discs mounted on the plough; the diameter of the discs; and the actual depth of disc penetration.

With the development of more powerful and faster tractors and higher duty ploughs, discs are required to withstand ever increasing stresses. To the present time the structural design of the disc has remained traditional and improvements in performance and life of the discs have been achieved by concentrating on the properties of the steel in the discs. However, the known methods of improving discs metallurgically have limitations which have been fully explored and a limit of serviceability has been reached. A basic improvement in design is therefore necessary if disc ploughs are to match the potential of modern tractors.

Conventionally, a plough disc is fixed to a rear mounting flange by four bolts having square heads which are countersunk into square "dimples" formed in the disc so that the bolt heads lie flush with the front face of the disc. Under the present design, the central part of the disc to quite rigid and when the disc is loaded stresses concentrate in this rigid center. The majority of disc failures are caused by fractures starting at the square dimpled holes with the fractures extending toward the periphery of the disc. Operating experience clearly indicates that the dimpled holes become significant potential stress risers, especially in larger discs having diameters of 24 inches and greater.

An additional factor which is relevant to the concentration of stresses in the central part of the disc derives from the fact that no two surfaces in contact, where curved or flat, are ever perfectly matched unless specially lapped together. Matching will always tend to occur on the three most prominent points of contact. Thus in the case of the plough disc the tightening of the four clamping bolts will create initial stresses in the rigid central part of the disc. These initial stresses will in certain circumstances add to the stressing of the disc when it is working, thus increasing the likelihood of disc fracture.

SUMMARY OF THE INVENTION

The present invention aims at improving the serviceability of a cultivating disc by improved structural design rather than by metallurgical improvements in the disc material.

According to the invention there is provided a cultivating disc having a central aperture and connecting at a plurality of locations disposed around the central aperture to a mount member in such manner that at said locations localised radial movements of the disc are permitted.

This invention also provides a cultivating disc having a central aperture and connected at a plurality of locations disposed around the central aperture to a mount member in such manner that at said locations localized movements of the disc in radially outward directions are substantially unrestrained.

The disc may, for example, be connected to the mount member by means of clamping bolts extending through radial slots formed in the disc at said locations. The slots may open at their inner ends into said aperture.

The bolts may tighten against a common keeper plate so that the disc is clamped between the keeper plate and the mount member. The mount member and the keeper plate may be shaped such that the disc is so clamped around its entire inner periphery. The keeper plate may cover said aperture in the disc.

The central part of the disc may be either concave, convex or flat, the keeper plate and mount member being shaped to match.

The invention further extends to a cultivating implement fitted with one or more discs of the type defined above, each disc being mounted on the implement by means of the respective mount member.

In order that the invention may be more fully explained one particular embodiment thereof will now be described in detail with reference to the accompanying drawings.

BRIEF DESCRIPTION OF THE DRAWINGS

In the drawings,

FIG. 1 is a major part of a diametral cross-section through a cultivator disc assembly;

FIG. 2 is a front view of the central part of the disc assembly with one half of a circular keeper plate broken away; and FIG. 3 is a major part of a diametral cross-section through a modified form of cultivator disc.

DESCRIPTION OF SPECIFIC EMBODIMENTS

The assembly of FIGS. 1 and 2 comprises a disc 3 connected to a rear mount member 4. The mount member is of entirely conventional construction being formed as a hollow boss 5 having an end flange 6 which is dished to suit the concavity of the disc and is drilled with four circumferentially spaced holes 7 to receive a set of disc clamping bolts (not shown).

Contrary to conventional design, the disc 3 has a central circular aperture 8 from which four slots 9 extend radially outwardly. Slots 9 are of such length that their outer ends 11 register with the openings 7 in the mount member 4.

A circular keeper plate 12 is disposed against the front of the disc. This keeper plate covers the disc aperture 8 and the slots 9 and it is provided with four beveled square holes 13 which register with the outer ends 11 of the slots 9 and the openings 7 of member 4, whereby the stems of the bolts engage the disc 3 at the outer ends of the slots 9 when the disc is assembled to the mount 4.

Disc 3 is annularly crimped at 14 so that the central portion 15 of the disc is recessed relative to the skirt or crown portion 16 and the keeper plate 12 is set into the recess so that its front face is flush with the front face of the crown portion 16 of the disc. The keeper plate is of such thickness that the heads of the clamping bolts are accommodated totally within the openings 13 so that there are no projections to disrupt the smooth front face of the disc assembly. Flats 10 are machined in the back of the mount flange 6 about each of the holes 7 to provide proper seating of the nuts on the other ends of the clamping bolts.

When the clamping bolts are tightened, the central portion 15 of the disc 3 is firmly clamped between keeper plate 12 and mount member 4, the stems of the clamping bolts extending through the outer ends of slots 9. However, the provision of the large central aperture 8 and the four radial slots 9 has greatly reduced the stiffness of the central portion 15 of the disc as compared with the conventional discs and the mounting of the disc is such as to permit the central portion to behave elastically under working stresses. Working stresses in the disc tend to distort it such as to produce localised movements of the disc in radially outward directions in the regions of the clamping bolts. Such movements are unrestrained since the ends of the slots 9 can move radially outwardly away from the stems of the clamping bolts. Thus by reducing the stiffness of the central portion of the disc and mounting that portion so as to permit distortional movements, the disc is permitted to behave elastically under working which greatly reduces the risk of fracture.

The square holes for the heads of the clamping bolts are no longer formed in the disc but in a separate keeper plate wherein their stress concentration effect is not critical. The keeper plate can be quite cheaply manufactured either from suitable steel or a suitable ferrous casting.

The crimp 14 not only enables recessing of the keeper plate 12 to provide a smooth front face for the assembly. It also stiffens the crown of the disc and helps to eliminate crown deformation under operating conditions. Furthermore, it causes a more uniform distribution of stresses in the elastic center portion of the disc. Hence the addition of the crimp 14 greatly enhances the benefits furnished by the invention.

FIG. 3 shows a disc which is the same as that shown in FIGS. 1 and 2 except that its central portion 15' within the annular crimp 14' is flat instead of dished. Discs of this form can be bolted to flat mounting flanges so that the manufacture of suitable mount members and keepers plates is simplified. Since one of the features of the invention is to weaken the central part of the disc the flattening of this part does not prejudice the performance of the final assembly.

The illustrated constructions have been advanced by way of example only and many modifications and adaptations could be made thereto. For example, although the illustrated constructions each have four radial slots and can be fitted to conventional disc mountings, the number of slots and clamping bolts could readily be varied. In fact, in many discs it may be preferable to provide only three bolts. In a further modification the slots might not open into the central aperture of the disc. In fact it would be possible to replace the slots by holes of circular or other shapes, such holes being larger than the stems of the clamping bolts. It will be appreciated that these and many other variations can be made without departing from the spirit and scope of the appended claims.

I claim:

1. In combination, a cultivating disc having a central aperture therethrough and a plurality of elongated openings extending therefrom at locations spaced around the central aperture, a rigid disc mount member disposed to one side of the disc and traversing said locations, and fastener means fastening the disc to the mount member at said locations, said fastener means comprising stem portions extending through said openings in the disc and engaging the outer radial rims of the elongated openings to provide positive location of the disc against bodily movement in radial directions relative to the mount member, said openings extending into the regions immediately radially inwardly of the stem portions so that at said locations localized distortional movements of the disc in radially outward directions are substantially unrestrained.

2. The combination of claim 1, wherein said openings are in the form of radial slots in the disc.

3. The combination of claim 2, wherein said slots open inwardly into said aperture.

4. The combination of claim 2, wherein the stem portions are engaged with the outer ends of the slots.

5. The combination of claim 1, wherein the fastener means comprises a plurality of clamping bolts the stems of which constitute said stem portions, and a keeper plate disposed to the side of the disc opposite to that of the mount member, said keeper plate also traversing said locations, the disc being clamped between the keeper plate and the mount member on tightening of said clamping bolts.

6. The combination of claim 5, wherein the keeper plate covers said aperture.

7. The combination of claim 1, wherein the disc is annularly crimped to form a central portion which is recessed relative to a surrounding crown portion, the recessed central portion embracing said locations.

8. The combination of claim 7, wherein a keeper plate is disposed within the recessed central portion of the disc, the keeper plate covering said aperture and traversing said locations, said fastener means being secured to said keeper plate, the exposed surface of said keeper plate and the exposed surface of said crown portion of said disc defining a smooth and continuous front face.

* * * * *